Patented May 25, 1937

2,081,173

UNITED STATES PATENT OFFICE 2,081,173

MANUFACTURE OR TREATMENT OF ARTIFICIAL MATERIALS

Henry Dreyfus, London, England

No Drawing. Application January 3, 1936, Serial No. 57,453. In Great Britain January 23, 1935

6 Claims. (Cl. 8—20)

This invention relates to the manufacture or treatment of artificial materials, particularly filaments, threads, fibres, ribbons, films and like materials having a basis of cellulose acetate or other filament-forming base which is capable of being softened by suitable organic liquids.

In processes for improving the properties of materials of the type referred to above by treatments involving subjecting the materials to liquid softening, swelling or shrinking media containing relatively volatile constituents, it is convenient to employ as the softening, swelling or shrinking medium not a single organic liquid, but a mixture of two or more liquids of different solvent powers for the base of the artificial materials, since in this way the solvent power of the medium may readily be adjusted. Thus, many organic liquids which if employed alone would have far too strong a solvent action on the base of the materials may successfully be employed in admixture with liquids of low solvent power for the base of the materials, for example liquids which have appreciably no solvent or swelling effect on the base of the materials at ordinary temperatures. The liquids available for use in such processes are in general relatively volatile and since in general the volatility of the various constituents of a softening, stretching or shrinking bath will not be the same, such baths tend to undergo alteration in composition owing to the evaporation of the constituents at different rates. While it is obvious that large changes in the composition of the softening, swelling or shrinking bath are undesirable, it appears equally obvious that the loss of a more volatile constituent from the bath may readily be compensated for by the continuous addition of fresh quantities of that constituent. I have found, however, as described in U. S. application S. No. 730,475 filed 13th June 1934, that this is in fact not so in stretching processes. I have found that in such processes the materials in the softened condition are extraordinarily sensitive to even slight changes in the solvent power of the softening bath, so that it is of the utmost importance to maintain the composition of the bath constant so long as the materials are in contact therewith, and particularly during the actual stretching operation. Substantial changes in the composition of the bath may not only lead to lack of uniformity in the tensile and other properties of the materials, but may cause breakage or even solution of the materials.

I have now found that similar considerations obtain even in processes wherein the softened materials are not subjected to tension sufficient to stretch them. Thus, according to the present invention in processes wherein filaments, threads, fibres, ribbons, films and like materials having a basis of cellulose acetate or other artificial filament-forming base are treated with liquid softening, swelling or shrinking media in the absence of tension sufficient to stretch the materials, I employ as the softening, swelling or shrinking media mixtures of two or more liquids of different solvent power for the base of the materials, said liquids being of such volatility that the composition of the mixture does not tend to undergo substantial change owing to evaporation throughout the temperature range to which the materials are subjected while they are in contact with the mixture, and particularly during the shrinking operation. By ensuring that the constituents of the mixture are of substantially the same volatility at the operating temperature, the composition of the mixture may readily be maintained within the very narrow limits referred to above.

The invention is of particular importance in connection with processes for shrinking threads of cellulose acetate or like materials of high tenacity with a view to increasing the extensibility of the materials, and is described herein with particular reference to such processes. As shrinking agents for cellulose acetate I prefer to employ mixtures of a liquid which is a swelling agent or latent solvent but not a true solvent for cellulose acetate, with a diluent, non-solvent or liquid of very low solvent power for cellulose acetate, which has substantially the same volatility as the swelling agent or latent solvent at the operating temperature. Suitable swelling agents or latent solvents for cellulose acetate are to be found among the ethers and among the chlorinated aliphatic hydrocarbons. Suitable diluents or non-solvents may be found among the hydrocarbons, the chlorinated hydrocarbons and the ethers. Very suitable mixtures for shrinking cellulose acetate threads and like materials may be made by diluting ethyl acetate with benzene. Although it is preferred to employ mixtures in which even the constituent of highest solvent power for the cellulose acetate is not a true solvent therefor at ordinary temperatures, the use of mixtures containing true solvents is not excluded. Among volatile organic liquids having a relatively high solvent power for cellulose acetate are acetic acid, formic acid, dioxane, acetone, methyl ethyl ketone and methylene ethylene ether. Any of these swelling agents may be employed in the process of the present invention in admixture with organic liquids of different, and preferably of lower, solvent power but of substantially the same volatility at the working temperature, which will in general be from 25–35° C. Thus, for example, methyl ethyl ketone may with advantage be employed in admixture with benzene or with cyclohexane and methylene ethylene ether with n-butyl chloride. In general it will be found of advantage to employ a liquid medium of such composition that the amount of shrinkage produced in the absence of substantial tension is comparatively small, for example 5–10% of the initial length of the materials, although higher degrees of shrinkage, e. g. 15–20%, are not excluded. For any particular agent and conditions of treatment the increase in the extensibility of the materials is dependent upon the extent of the shrinkage.

The liquid medium is preferably applied to the materials by means of a bath treatment. It is of advantage that the shrinkage should occur in the bath in which the shrinking agent is applied, although the invention includes processes wherein the materials are treated with the shrinking agent and at least a part of the shrinkage produced occurs during a subsequent batching operation. Preferably the process is a continuous one, the materials being, for example, passed continuously through the bath containing the liquid medium at such a speed as to permit of the desired shrinkage. The materials may conveniently be drawn through the bath by means of two or more rollers or sets of rollers spaced along the path of the materials, immersed or partially immersed in the bath, and rotating at appropriate speeds. It is of advantage to treat the threads in warp formation, that is in substantially parallel alignment one to another. In this way a large number of threads may be simultaneously treated with highly uniform results. Although as indicated above it is preferred to effect shrinkage while the materials are passing through a bath of shrinking agent, other methods of applying the shrinking agent, e. g. by padding or even spraying, are not excluded. Thus for example the threads may pass first between padding rollers supplied with the shrinking agent and then through a further set of rollers or through several further sets in turn, rotating more slowly than the padding rollers so as to allow the shrinkage to take place; or the thread may pass around two or more successive spaced rollers or through two or more successive spaced sets of rollers, driven at speeds which diminish from one roller or set of rollers to the next, and the shrinking agent may be sprayed on to the rollers and/or the material and/or may be applied from a shallow bath in which one or more rollers of each set dip and the path of the threads may be wholly or in part above the surface of said bath. The invention, moreover, is not limited to a continuous process and includes, for example, the treatment of the materials in hank form or on bobbins, swifts or other package carriers or in the form of centrifugal spinning box cakes. By means of resilient bobbins, swifts or other supports shrinkage may be permitted while the yarn is in package form, or alternatively the yarn may be wound off from the package, allowed to shrink and wound at a suitably slower speed so as to permit the desired amount of shrinkage instead of unwinding from a bobbin or other package. Filaments, threads or like materials proceeding directly from a spinning process or from a stretching process may be treated and shrinkage may be permitted to take place continuously with the stretching of the materials. If desired the shrinking medium may be the agent employed to facilitate the stretching so that the yarn, for instance ordinary dry spun yarn, may be treated with a shrinking medium acting as a softening agent, stretched, and, without the removal of the agent, allowed to shrink by the desired amount.

With a view to facilitating the action upon the materials of the liquid media the materials may be pretreated before the shrinking operation proper by any suitable means. They may, for example, be passed through baths containing one or more of the constituents of the shrinking medium proper in such concentration as to exert little or no shrinking action on the materials, or they may be treated so as to remove water or other liquid capable of reducing the rate at which shrinkage occurs under the influence of the shrinking medium. It is of advantage that any pretreating agent employed should fulfill the same conditions as to the volatility of its constituents as the shrinking agent proper.

The following examples illustrate the invention:—

Example 1

Cellulose acetate yarn is caused to pass in warp formation through a number of successive sets of rollers, spaced apart in a bath containing ethyl acetate in admixture with 25 to 30% of its volume of benzene, and driven at speeds which diminish from one set of rollers to the next. The roller speeds are such that the yarn shrinks by 5–10% of its original length in passing through the bath. The yarn leaving the bath is washed, dried and collected.

Example 2

A hank of cellulose acetate yarn of high tenacity is suspended by one end from a rotating mandrel within the bath of Example 1 for half a minute to three minutes according to the amount of shrinkage desired.

Example 3

A perforated bobbin wound with cellulose acetate yarn of high tenacity in such a way as to facilitate shrinkage is immersed in the bath of Example 1 for a period of 1–3 minutes according to the degree of shrinkage desired.

Example 4

The process is carried out in the same way as in Example 1 except that the speeds of the rollers are such as just to prevent any substantial degree either of shrinkage or of stretch from occurring.

In a similar way other baths may be used, e. g. mixtures of methyl ethyl ketone with benzene or with cyclohexane or of methylene ethylene ether with n-butyl chloride.

Since, as indicated above, the most important application of the invention is in the treatment of materials having a basis of cellulose acetate, the invention has been described with particular reference to such treatment. The invention is, however, also applicable to the treatment of materials made of other filament-forming bases of a like nature, that is to say other filament-forming bases which are relatively inelastic and may be softened by treatment with suitable organic liquids. The base of the materials treated may, for example, be nitrocellulose, cellulose formate, propionate, butyrate; ethyl, methyl or benzyl cellulose; ethyl cellulose acetate, oxyethyl cellulose acetate or other ether or ester of cellulose.

Although the invention has been described with particular reference to the treatment of threads, the process is applicable also to the treatment of materials of other form, for example ribbons or even films. The invention is also applicable to treatments wherein sufficient tension is applied to the materials to prevent any substantial degree of shrinkage without, however, stretching the materials. Such treatments are described, for example, in British Patent No. 336,217 and the invention includes the application of the principles set forth herein to processes such as are described in that specification.

Having described my invention what I desire to secure by Letters Patent is:—

1. Process for improving the properties of filaments, threads, ribbons and like materials of cellulose acetate or like filament-forming bases, comprising treating the materials with a mixture consisting substantially of two or more volatile liquids of different solvent powers for the filament-forming base but of substantially the same volatility in the absence of tension sufficient to stretch the materials.

2. Process for improving the properties of filaments, threads, ribbons and like materials of cellulose acetate or like filament-forming bases, comprising shrinking the materials by a bath treatment with a mixture consisting substantially of two or more volatile liquids of different solvent powers for the filament-forming base but of substantially the same volatility.

3. Process for improving the properties of filaments, threads, ribbons and like materials of cellulose acetate or like filament-forming bases, comprising shrinking the materials by a bath treatment with a mixture consisting substantially of two volatile non-aqueous liquids of different solvent powers for the filament-forming base but of substantially the same volatility.

4. Process for improving the properties of filaments, threads and ribbons of cellulose acetate, comprising shrinking the materials by a bath treatment with a mixture consisting substantially of ethyl acetate and benzene at a temperature between 25 and 35° C.

5. Process for improving the properties of filaments, threads and ribbons of cellulose acetate, comprising shrinking the materials by a bath treatment with a mixture consisting substantially of ethyl acetate and cyclohexane at a temperature between 25 and 35° C.

6. Process for improving the properties of filaments, threads and ribbons of cellulose acetate, comprising shrinking the materials by a bath treatment with a mixture consisting substantially of methyl ethyl ketone and a substance selected from the class consisting of benzene and cyclohexane.

HENRY DREYFUS.